(12) United States Patent
Costes

(10) Patent No.: US 7,893,820 B2
(45) Date of Patent: Feb. 22, 2011

(54) METHOD OF TRANSMITTING AN ELECTROMAGNETIC IDENTIFICATION REQUEST SIGNAL TO AN ELECTRONIC HOUSING MOUNTED ON A WHEEL OF A VEHICLE

(75) Inventor: Olivier Costes, Tournefeuille (FR)

(73) Assignee: Continental Automotive France, Toulouse (FR)

( * ) Notice: Subject to any disclaimer, the term of this patent is extended or adjusted under 35 U.S.C. 154(b) by 587 days.

(21) Appl. No.: 11/997,157

(22) PCT Filed: Jun. 30, 2006

(86) PCT No.: PCT/EP2006/006398

§ 371 (c)(1),
(2), (4) Date: Jan. 29, 2008

(87) PCT Pub. No.: WO2007/014609

PCT Pub. Date: Feb. 8, 2007

(65) Prior Publication Data

US 2008/0231436 A1  Sep. 25, 2008

(30) Foreign Application Priority Data

Aug. 4, 2005   (FR) .................................. 05 08311

(51) Int. Cl.
*B60C 23/00* (2006.01)
(52) U.S. Cl. ...................... 340/444; 340/447; 340/442; 340/438; 73/146.5; 73/146.4; 116/34 R
(58) Field of Classification Search ................ 340/447, 340/442, 438, 444; 73/146.5, 146.4; 116/34 R
See application file for complete search history.

(56) References Cited

U.S. PATENT DOCUMENTS

| | | | | |
|---|---|---|---|---|
| 4,828,334 A | * | 5/1989 | Salman | 303/191 |
| 5,267,166 A | * | 11/1993 | Takata et al. | 701/207 |
| 6,012,005 A | * | 1/2000 | Gscheidle et al. | 701/34 |
| 6,275,148 B1 | * | 8/2001 | Takamura et al. | 340/442 |
| 6,441,727 B1 | * | 8/2002 | LeMense | 340/442 |
| 6,518,875 B2 | * | 2/2003 | DeZorzi | 340/442 |
| 6,580,364 B1 | * | 6/2003 | Munch et al. | 340/447 |
| 6,871,157 B2 | | 3/2005 | Lefaure | |
| 2005/0163063 A1 | | 7/2005 | Kuchler et al. | |

FOREIGN PATENT DOCUMENTS

| | | |
|---|---|---|
| EP | 1 536 392 A1 | 6/2005 |
| FR | 2 865 589 A | 7/2005 |
| WO | 02/051654 A1 | 7/2002 |

* cited by examiner

*Primary Examiner* — Daryl Pope
(74) *Attorney, Agent, or Firm* — Young & Thompson

(57) ABSTRACT

Method of transmitting an electromagnetic identification request signal, generated by an antenna (11-14) connected to a central unit (15) mounted on a vehicle (1), to an electronic housing (6-9) mounted on a wheel (2-5) of the vehicle. This transmission method includes successively transmitting, after starting of the vehicle (1), a plurality of identical identification request signals (S1 . . . , Si, Si+1, . . . ), and wherein, after each transmission at an instant Ti of a signal Si, the speed of travel V of the vehicle (1) is measured, the time Tr of a complete rotation of the wheel (2-5) is calculated for the speed V, and the following signal Si+1 is triggered at an instant Ti+1 such that: Ti+1=Ti+nTr+Tθ with n integer ≧1 and 0<Tθ<Tr.

3 Claims, 2 Drawing Sheets

Figure 1:
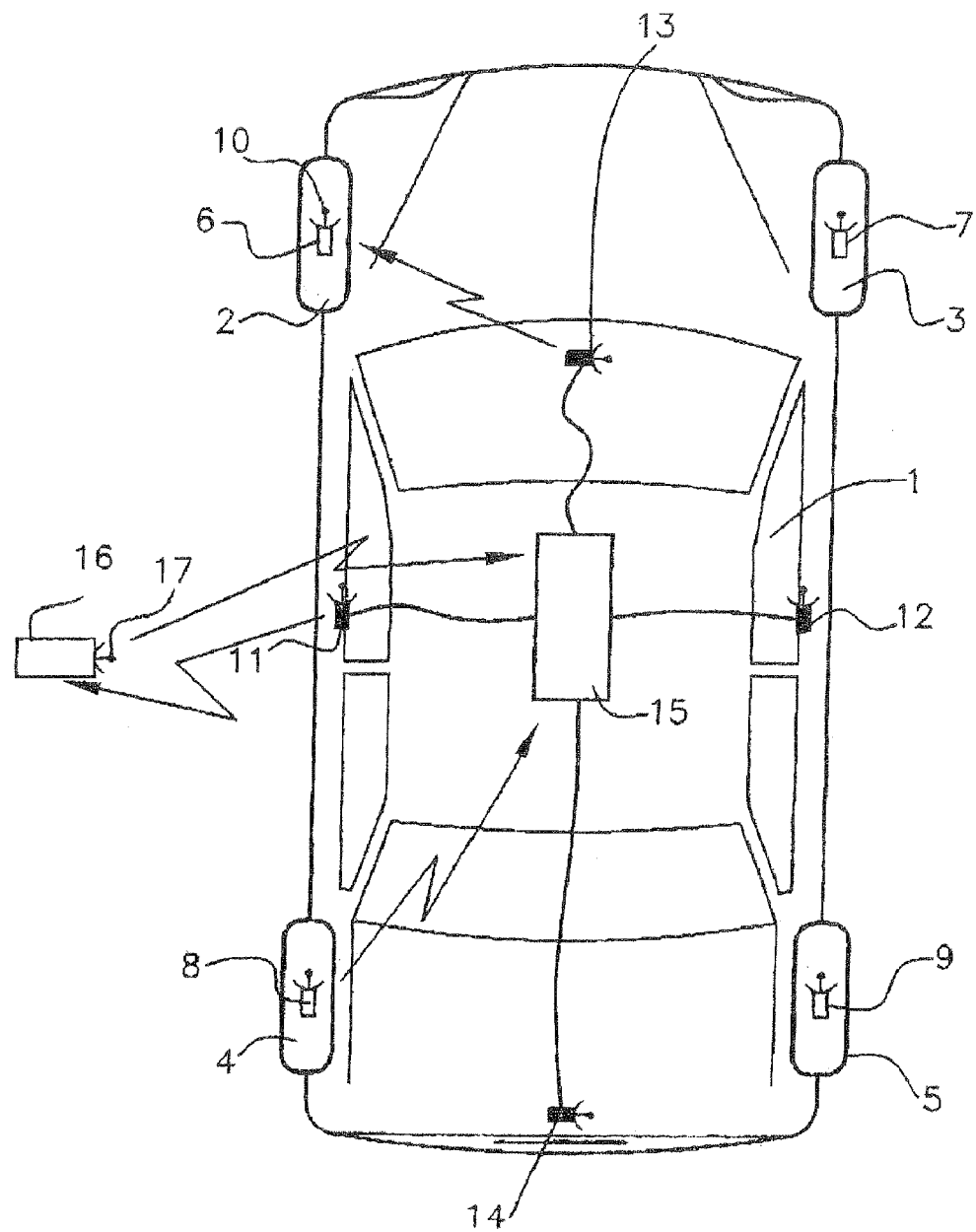

METHOD OF TRANSMITTING AN
ELECTROMAGNETIC IDENTIFICATION
REQUEST SIGNAL TO AN ELECTRONIC
HOUSING MOUNTED ON A WHEEL OF A
VEHICLE

The invention relates to a method of transmitting an electromagnetic identification request signal, generated by means of an antenna connected to a central unit mounted on a vehicle, to an electronic housing mounted on a wheel of said vehicle.

More and more motor vehicles are, for safety purposes, being provided with monitoring systems comprising sensors mounted on each of the wheels of the vehicle and dedicated to measuring parameters, such as pressure or temperature of the tires with which these wheels are equipped, and intended to inform the driver of any abnormal variation in the measured parameter.

These monitoring systems are conventionally fitted with an electronic housing mounted on each of the wheels of the vehicle, comprising a microprocessor and a radiofrequency transmitter (or RF transmitter), and a central unit for receiving the signals transmitted by the transmitters, comprising a computer integrating a radiofrequency receiver (or RF receiver) connected to an antenna.

One of the problems that such monitoring systems are required to solve resides in the obligation to have to associate with each signal received by the receiver of the central unit an item of information concerning the location of the sensor and therefore of the wheel from which this signal originates, this obligation persisting throughout the lifetime of the vehicle, that is to say, having to be complied with even after wheels are changed or more simply after the position of these wheels are swapped.

At the present time, a first locating process consists in using three low-frequency antennas, each positioned in immediate proximity to one of the wheels of the vehicle, and in performing a locating procedure consisting in successively exciting each of these three antennas by emitting a low-frequency magnetic field.

According to this procedure, the sensor mounted on the wheel situated in proximity to the excited antenna orders, in response and intended for the central unit, the transmission of a low-frequency signal comprising a code identifying said sensor, so that the successive excitation of the three antennas leads to the locating of the three sensors mounted on the wheels juxtaposed to these antennas, and, by deduction, to the locating of the fourth sensor.

The main advantage of such a method resides in the fact that the locating procedure is very fast and leads to quasi-instantaneous location after the vehicle is started.

On the other hand, this solution requires that the vehicle be equipped with three antennas with all the attendant impositions: connection cables, control amplifiers, etc., so that it turns out to be expensive.

This drawback relating to the expense of installing the means for implementing the locating method can be solved when the vehicle is equipped with a hands-free access device intended to make it possible to access said vehicle and to start the latter.

Indeed, the solution then consists, as in particular described in patent application WO 02/051654, in using the transmit antennas of this hands-free access device that are already mounted on the vehicle to implement the wheel locating procedure.

As described in the abovementioned patent application, the implementation of this solution consists, for example, in ordering the transmission by the transmit antennas of an uncoded signal when said antennas are used with a view to locating the wheels, and in ordering the transmission of a coded signal when the antennas are used for their original purpose of controlling access to the vehicle.

Such a solution turns out, however, to present a major drawback resulting from the fact that the antennas of the hands-free access devices are not positioned ideally with a view to allowing location of the wheels of a vehicle.

Indeed, the positioning of the antennas, which is designed to optimize the operation of the hands-free access system, leads to the creation, during the rotation of the wheels and therefore of the electronic housings with which the latter are equipped, of angular zones of non-reception, by these electronic housings, of the signals transmitted by these antennas.

Figure 3A:
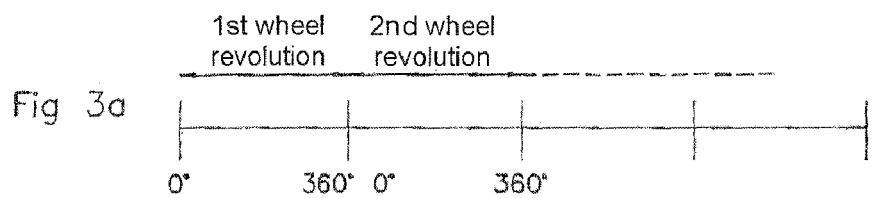
Figure 3B:
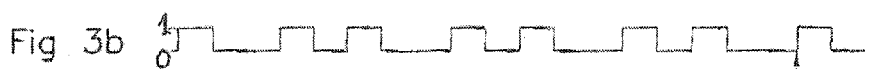

The existence of these non-reception zones emerges from the analysis of FIGS. 3a and 3b which illustrate the results of measurements of reception, by an electronic housing mounted on a front right wheel of a vehicle, of the electromagnetic signals transmitted periodically by an antenna mounted on the handle of the front right door of this vehicle. In view of this illustration, these figures respectively represent, in projection on a horizontal axis:

the trajectory traversed by an electronic housing mounted on a wheel (FIG. 3a), and the corresponding zones of non-reception (level 0 in FIG. 3b) and of reception (level 1 (FIG. 3b)) by this housing of the electromagnetic signals transmitted by the antenna.

It emerges clearly from these figures that the electronic housing that is the subject of the test performed is, at given moments, situated in zones of non-reception of the signals transmitted by the antenna responsible for transmitting the identification request signals to said housing.

Therefore, the reception of the identification signals by the electronic housings becomes hypothetical, and it is impossible to control the time required to perform a complete wheel locating procedure, or even to guarantee the culmination of this procedure.

The present invention is aimed at alleviating this drawback, and its main objective is to provide a transmission method that is very efficacious in terms of responsiveness and reliability.

To this end, the invention is aimed at a method of transmitting an electromagnetic identification request signal, generated by means of an antenna connected to a central unit mounted on a vehicle, to an electronic housing mounted on a wheel of said vehicle, this transmission method:

consisting in successively transmitting, after starting of the vehicle, a plurality of identical identification request signals (S1 . . . , Si, Si+1, . . . )

and being characterized in that it consists, after each transmission at an instant Ti of a signal Si:

in measuring the speed of travel V of the vehicle and in calculating the time Tr of a complete rotation of the wheel for said speed V, and in triggering the following signal Si+1 at an instant Ti+1 such that Ti+1=Ti+nTr+Tθ with n integer $\geq 1$ and 0<Tθ<Tr.

It should be noted that, according to the invention, the expression electromagnetic signal is understood generally to encompass low-frequency "LF" signals and radiofrequency "RF" signals.

The transmission method according to the invention makes it possible to circumvent the problems posed by the non-reception zones by virtue of the triggerings of the electromagnetic signals synchronized with the speed V of the vehicle and especially shifted, between two transmissions, by a time span of given duration T θ that is less than the complete rotation time of said wheel.

Such a method which allies a "synchronization plus a shift" leads in fact to shifting, between two successive triggerings of an identification request signal, the relative angular position of an electronic housing with respect to the transmit antenna associated with said housing, and thus guarantees, in a regular manner and with a high frequency, a positioning of this electronic housing in a reception zone, and consequently fast culmination of the locating procedure. Indeed by angularly shifting the instant at which the signal is transmitted, the electronic housing will more rapidly lie in a reception zone and will not remain constantly in a non-reception zone.

Moreover, such a method requires, with a view to its implementation, the measurement of only a single data item which consists in the speed of the vehicle. Now, this parameter is currently measured and available on the inter computer connection network mounted on all vehicles, so that the implementation of the method according to the invention requires only a software adaptation of the current wheel locating procedures.

Finally, the transmission method according to the invention cloaking the problem of the non-reception zones, it makes it possible to guarantee fast locating of the wheels of a vehicle by using, with a view to transmitting the identification request signals, the antennas of the hands-free access device with which this vehicle is equipped.

According to an advantageous mode of implementation of the invention, with a view to determining each time interval $(T_{i+1}-T_i)$ separating two successive signal triggerings, a variable value T0 is used, dependent on the measured speed of travel V of the vehicle, and such that T$\theta$=k Tr, with 0<k<1.

This mode of implementation which consists in synchronizing the duration of the shift T$\theta$ with the speed V of travel of the vehicle leads, in fact, to the obtaining of a precise angular sampling which optimizes the procedure according to the invention.

Moreover, in an advantageous manner according to the invention, a value $\theta$ is used such that: T$\theta$=k Tr with 0<k<0.05.

Figure 2:
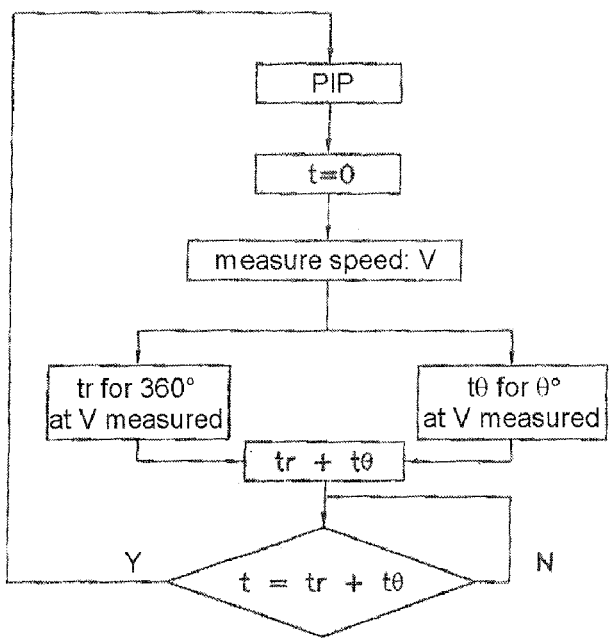
Figure 3C:
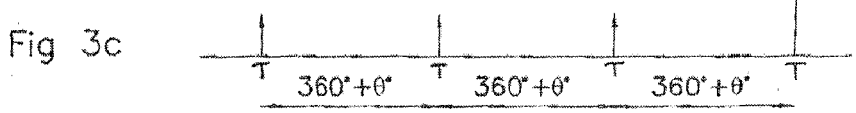

Other characteristics, aims and advantages of the invention will emerge from the detailed description which follows with reference to the appended drawings which represent by way of nonlimiting example a preferential embodiment thereof. In these drawings:

FIG. 1 is a diagrammatic view from above of a vehicle fitted with a monitoring system comprising a device for locating the wheels of said vehicle implementing the transmission method according to the invention, FIG. 2 is an algorithm representing the steps of the transmission method according to the invention, and FIGS. 3a to 3c are three graphics intended to illustrate the transmission method implemented in accordance with the invention.

The monitoring system implementing the transmission method according to the invention is represented, in FIG. 1, mounted on a vehicle 1 furnished with four wheels conventionally fitted with a tire: two front wheels 2, 3 and two rear wheels 4, 5.

Such monitoring systems conventionally comprise, firstly, associated with each wheel 2-5, an electronic housing 6-9, for example attached to the rim of said wheel so as to be positioned inside the envelope of the tire.

Each of these electronic housings 6-9 integrates for example sensors dedicated to the measurement of parameters, such as pressure and/or temperature of the tire, connected to a microprocessor possessing a code for identifying said housing, and linked to an RF transmitter connected to a low-frequency antenna such as 10.

The monitoring system comprises, also, a centralized computer or central unit 15 comprising a microprocessor and integrating an RF receiver able to receive the signals transmitted by each of the four electronic housings 6-9, and connected, for this purpose, to an antenna (not represented).

In a customary manner, such a monitoring system and in particular its central unit 15 are designed so as to inform the driver of any abnormal variation of the parameters measured by the sensors associated with the wheels 2-5.

The monitoring device according to the invention also comprises transmit antennas 11-14 connected to the central unit 15 and consisting of the antennas of a device customarily known by the term "hands-free device", adapted so as to make it possible to access the vehicle 1 and to start the latter by virtue of the identification of an electronic badge 16.

In accordance with the arrangements of such a hands-free access device, these antennas are four in number and consist respectively of:

a left antenna 11 positioned on the handle of the front left door of the vehicle, a right antenna 12 positioned on the handle of the front right door of the vehicle, a front antenna 13 positioned at the level of the dashboard of the vehicle, and a rear antenna 14 positioned on the handle of the door of the trunk of the vehicle.

The electronic badge 16 of this hands-free access system comprises, for its part, conventionally a computer integrating a low-frequency "LF" receiver and a radiofrequency "RF" transmitter connected to antennas such as 17.

In a customary manner, and with a view to locating the wheels 2-5 of the vehicle 1, the central unit 15 is programmed, after starting of said vehicle and for each of the antennas 11-14 used with a view to this locating, to transmit n identical successive electromagnetic identification request signals S1, ... Si, Si+1, ... Sn.

Such as represented in FIG. 2, the method of transmitting these n successive signals consists, according to the invention, after each transmission PIP, performed at an instant Ti, of a signal Si:

in measuring the speed of travel V of the vehicle 1, in calculating, on the one hand, the time Tr of a complete rotation of the wheel 2-5 for said speed V, and on the other hand, the time T$\theta$ taken by this wheel to traverse, with the same speed V, an arc of $\theta°$, with 0<$\theta$<18°, dependent on the measured amplitude of the reception zones, and in triggering the transmission PIP for the following electromagnetic signal Si+1 at an instant Ti+1 such that: Ti+1=Ti+Tr+T$\theta$ Such a transmission method therefore consists in triggering transmission "PIPs" for the electromagnetic signals synchronized with the speed V of the vehicle and shifted for each wheel revolution by a given value T$\theta$ also dependent on the speed V.

Such as represented in FIG. 3c taken in association with FIGS. 3a and 3b, when a transmission PIP (T FIG. 3c) for an electromagnetic signal occurs while the electronic housing of the wheel concerned is situated in a zone of non-reception (thereby corresponding to the first three PIPs represented in FIG. 3c), this "synchronization plus a shift" rapidly guarantees (at the fourth PIP FIG. 3c) the triggering of signals delivered while this housing is situated in a reception zone, and, consequently, guarantees the reception by said housing of an identification request signal and the transmission in return by the latter of its identification code.

The principle of the invention resides in the fact that by shifting the transmission of the PIP T by a value θ° (dependent on the speed of travel of the vehicle) at each wheel revolution, it is possible to exit rapidly from the zone of non-reception of this wheel instead of remaining constantly therein when the PIP is inconveniently situated in a zone of non-reception and no shift action is undertaken.

Thus, the transmission method according to the invention guarantees fast locating of the wheels of a vehicle by using, with a view to transmitting the identification request signals, the antennas of the hands-free access device with which this vehicle is equipped.

The invention claimed is:

1. A method of transmitting an electromagnetic identification request signal, generated by means of an antenna (11-14) connected to a central unit (15) mounted on a vehicle (1), to an electronic housing (6-9) mounted on a wheel (2-5) of said vehicle, this transmission method consisting in successively transmitting, after starting of the vehicle (1), a plurality of identical identification request signals ($S1 \ldots, Si, Si+1, \ldots$), and said transmission method being characterized in that it consists, after each transmission at an instant Ti of a signal Si:

in measuring the speed of travel V of the vehicle (1) and in calculating the time Tr of a complete rotation of the wheel (2-5) for said speed V, and in triggering the following signal $Si+1$ at an instant $Ti+1$ such that $Ti+1=Ti+nTr+T\theta$ with n integer $\geq 1$ and $0<T\theta<Tr$.

2. The transmission method as claimed in claim 1, characterized in that, with a view to determining each time interval ($Ti+1-Ti$) separating two successive signal triggerings, a variable value $T\theta$ is used, dependent on the measured speed of travel V of the vehicle (1), and such that $T\theta=k\,Tr$ with $0<k<1$.

3. The transmission method as claimed in claim 2, characterized in that a value θ is used such that: $T\theta=k\,Tr$ with $0<k<0.05$.

* * * * *